(12) United States Patent
Sims, Jr. et al.

(10) Patent No.: US 7,493,892 B1
(45) Date of Patent: Feb. 24, 2009

(54) SELF-DAMPING FUEL RAIL

(75) Inventors: Dewey McKinley Sims, Jr., Wayne, MI (US); Hursha Shankaranarayan, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/964,869

(22) Filed: Dec. 27, 2007

(51) Int. Cl.
*F02M 55/02* (2006.01)
*F16L 55/04* (2006.01)

(52) U.S. Cl. .................. 123/456; 123/467; 123/468; 138/30

(58) Field of Classification Search .......... 123/456, 123/467, 468, 469; 138/26, 28, 30
See application file for complete search history.

(56) References Cited

U.S. PATENT DOCUMENTS

| | | | | |
|---|---|---|---|---|
| 4,660,524 | A * | 4/1987 | Bertsch et al. | 123/468 |
| 6,354,273 | B1 * | 3/2002 | Imura et al. | 123/467 |
| 6,371,083 | B1 | 4/2002 | Rossi et al. | |
| 6,470,859 | B2 * | 10/2002 | Imura et al. | 123/467 |
| 6,497,219 | B2 | 12/2002 | Natsume | |
| 6,513,501 | B1 * | 2/2003 | Schwegler et al. | 123/463 |
| 6,601,564 | B2 * | 8/2003 | Davey | 123/456 |
| 6,615,801 | B1 * | 9/2003 | Zdroik | 123/467 |
| 6,640,783 | B2 * | 11/2003 | Braun et al. | 123/467 |
| 6,651,627 | B2 * | 11/2003 | Zdroik et al. | 123/456 |
| 6,672,286 | B2 * | 1/2004 | Miandoab et al. | 123/456 |
| 6,725,839 | B2 * | 4/2004 | Zdroik et al. | 123/456 |
| 6,854,447 | B2 * | 2/2005 | Miandoab et al. | 123/467 |
| 6,871,637 | B2 | 3/2005 | Tsuchiya et al. | |
| 6,892,704 | B2 * | 5/2005 | Tsuchiya et al. | 123/456 |
| 6,901,914 | B1 * | 6/2005 | Becene et al. | 123/456 |
| 6,935,314 | B2 * | 8/2005 | Zdroik et al. | 123/456 |
| 7,028,668 | B1 | 4/2006 | West et al. | |
| 7,036,487 | B2 * | 5/2006 | Braun et al. | 123/467 |
| 7,146,700 | B1 | 12/2006 | Darrah et al. | |
| 7,185,636 | B2 | 3/2007 | Usui et al. | |
| 2002/0053341 | A1 * | 5/2002 | Imura et al. | 123/456 |
| 2005/0257774 | A1 | 11/2005 | Usui et al. | |
| 2006/0081220 | A1 | 4/2006 | Sims, Jr. | |
| 2007/0169754 | A1 | 7/2007 | Usui et al. | |

\* cited by examiner

*Primary Examiner*—Thomas N Moulis
(74) *Attorney, Agent, or Firm*—Michael Best & Friedrich LLP

(57) ABSTRACT

A self-damping fuel rail for a fuel-injected internal combustion engine includes an elongated tube defining a wall and having a longitudinal axis. The wall defines a fuel passageway and has a first wall portion movable between a first position bowed inwardly toward the longitudinal axis when the self damping fuel rail is in a non-operative state, and a second position moved outwardly away from the longitudinal axis when the self-damping fuel rail is in an operative state. The self-damping fuel rail also includes at least one fuel outlet configured to facilitate communication between the fuel passageway and a fuel injector.

20 Claims, 8 Drawing Sheets

SELF-DAMPING FUEL RAIL

BACKGROUND

The present invention relates to fuel rails for fuel systems of internal combustion engines, and more particularly to self-damping fuel rails for damping pressure pulsations created by fuel injectors.

Typically, a fuel rail, or manifold, supplies fuel to a plurality of fuel injectors that inject the fuel into corresponding inlet ports of an engine. Electromagnetic fuel injectors deliver fuel to the engine in metered pulses which are appropriately timed to the engine operation. The sequential energization of the fuel injectors induces pressure pulsations within the fuel rail that may create various problems. For example, the pressure pulsations may improperly distribute fuel to the injectors, which can adversely affect tailpipe emissions and driveability, and/or may induce fuel line hammering, which can result in vibration and audible noise.

It is known to utilize a damper element inside the fuel rail to effectively minimize or dampen the pressure pulsations created by the fuel injectors. However, using a damper element increases the installation and assembly time of the fuel rail, and thus increases the overall cost.

SUMMARY

In one embodiment, the invention provides a self-damping fuel rail for a fuel-injected internal combustion engine. The self-damping fuel rail includes an elongated tube defining a wall and having a longitudinal axis. The wall defines a fuel passageway and has a first wall portion movable between a first position bowed inwardly toward the longitudinal axis when the self-damping fuel rail is in a non-operative state, and a second position moved outwardly away from the longitudinal axis when the self-damping fuel rail is in an operative state. The self-damping fuel rail also includes at least one fuel outlet configured to facilitate communication between the fuel passageway and a fuel injector.

In another embodiment, the invention provides a method of damping pressure pulsations within a self-damping fuel rail. The self-damping fuel rail includes an elongated tube and at least one fuel outlet. The elongated tube defines a wall and has a longitudinal axis. The wall defines a fuel passageway and has a first wall portion. The at least one fuel outlet is configured to facilitate communication between the fuel passageway and the fuel injector. The method includes positioning the first wall portion in a first position inwardly bowed toward the longitudinal axis when a fuel in the fuel passageway has a first pressure. The method also includes moving the first wall portion to a second position moved outwardly away from the longitudinal axis in response to the fuel in the fuel passageway achieving a second fuel pressure higher than the first fuel pressure.

In still another embodiment, the invention provides a method of designing a self-damping fuel rail. The method includes creating a first fuel rail model, modeling an external pressure on the first fuel rail model to create a second fuel rail model, and performing a stress analysis on the second fuel rail model. The method also includes varying a wall thickness of at least a portion of the first fuel rail model based on the stress analysis to create a third fuel rail model, modeling the external pressure on the third fuel rail model to create a fourth fuel rail model, and extruding a self-damping fuel rail according to the fourth fuel rail model.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
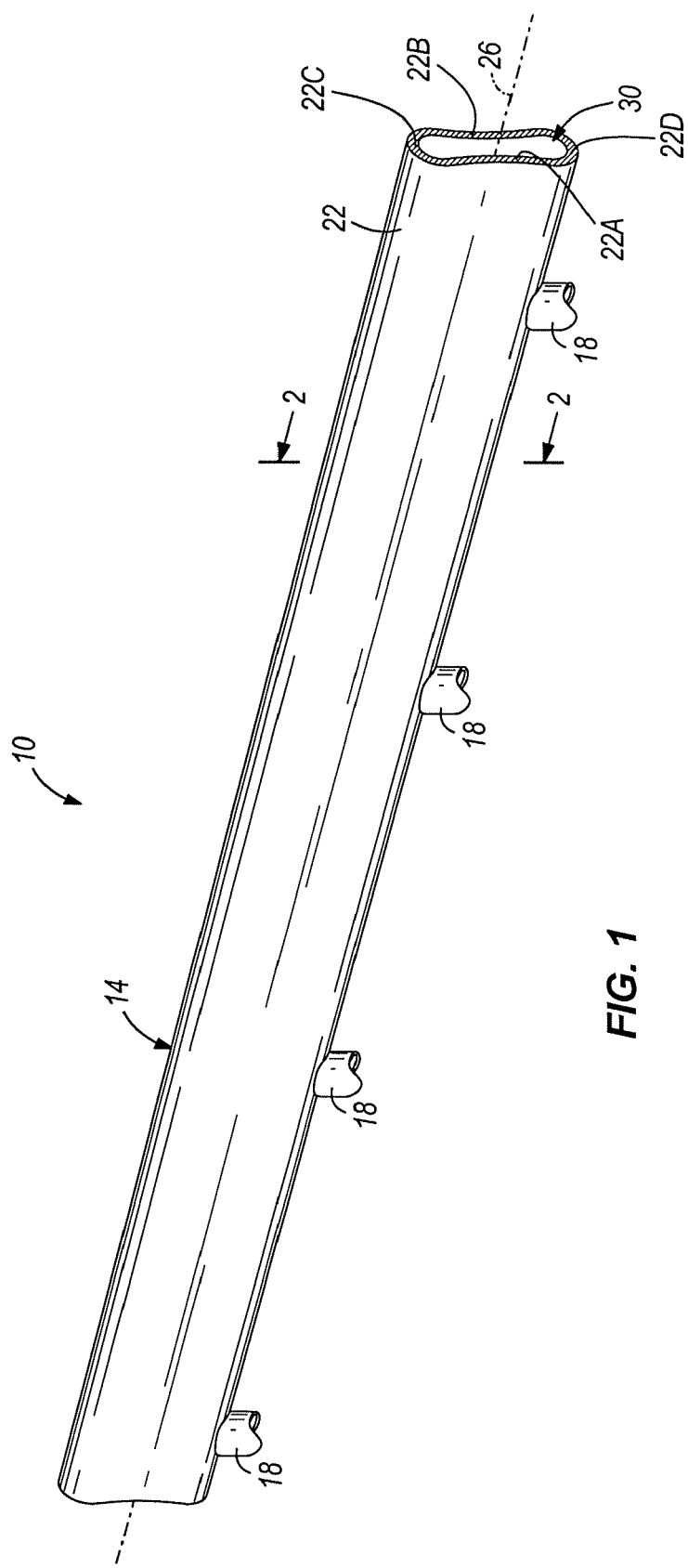
FIG. 1 is a perspective view of a self-damping fuel rail embodying the present invention.

FIG. 1 illustrates a self-damping fuel rail 10 embodying the present invention. The illustrated fuel rail 10 is configured for use in a fuel injection system to supply fuel (e.g., gasoline, diesel fuel, etc.) to fuel injectors of a fuel-injected internal combustion engine. In the illustrated embodiment, the fuel rail 10 includes an elongated tube 14 configured to temporarily hold or store the fuel and a plurality of fuel outlets 18 configured to couple to the fuel injectors. As further described below, a portion of the elongated tube 14 bends or flexes to an optimized configuration to help reduce or dampen pressure pulsations that may occur when the fuel injectors deliver fuel to the engine.

Figures 2A, 2B:
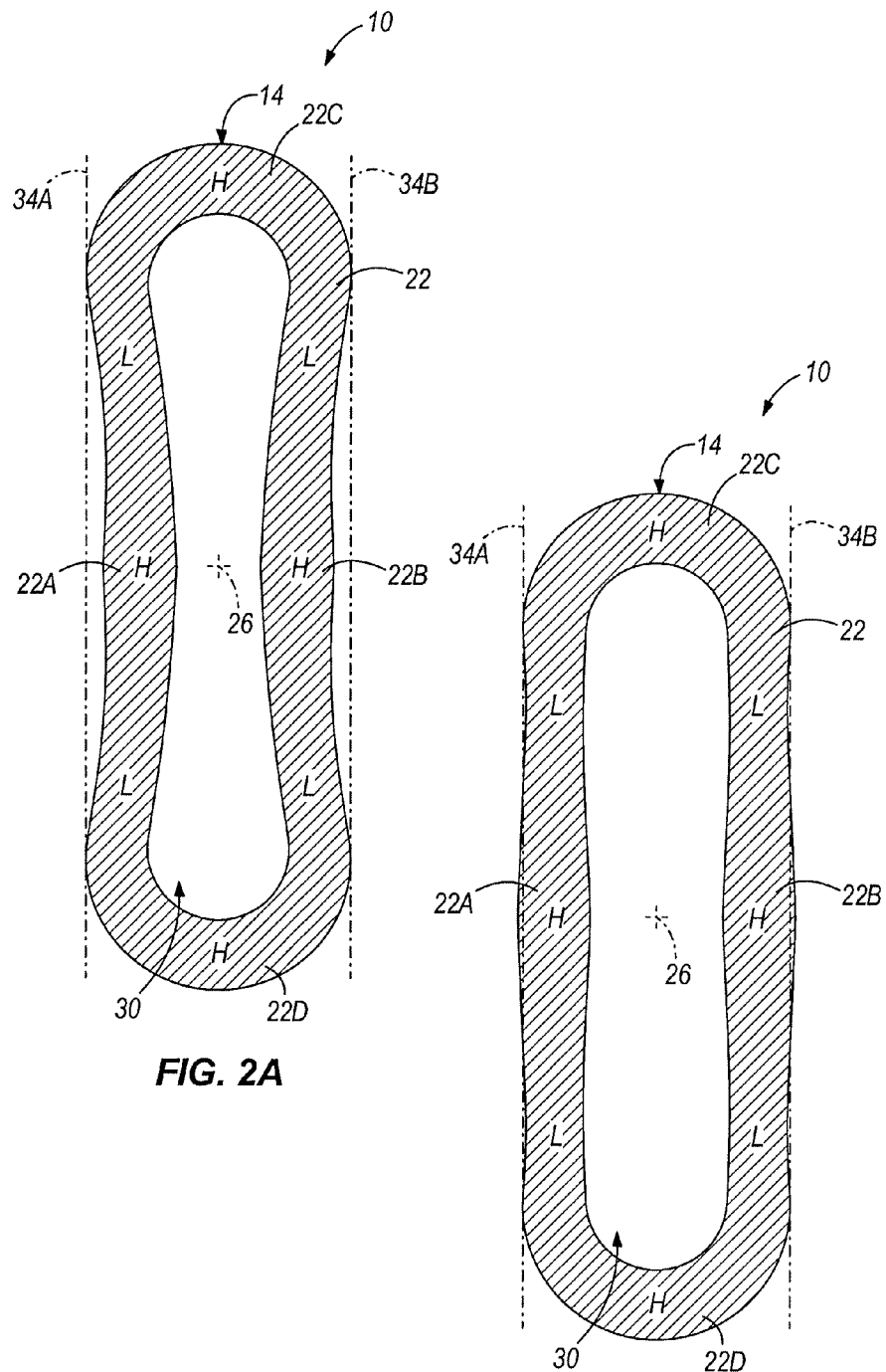
FIG. 2A is a cross-sectional view of the self-damping fuel rail shown in FIG. 1 taken along line 2-2 of FIG. 1, the self-damping fuel rail in a static position.
FIG. 2B is a cross-sectional view of the self-damping fuel rail shown in FIG. 1 taken along line 2-2 of FIG. 1, the self-damping fuel rail in a dynamic position.
Figure 2C:
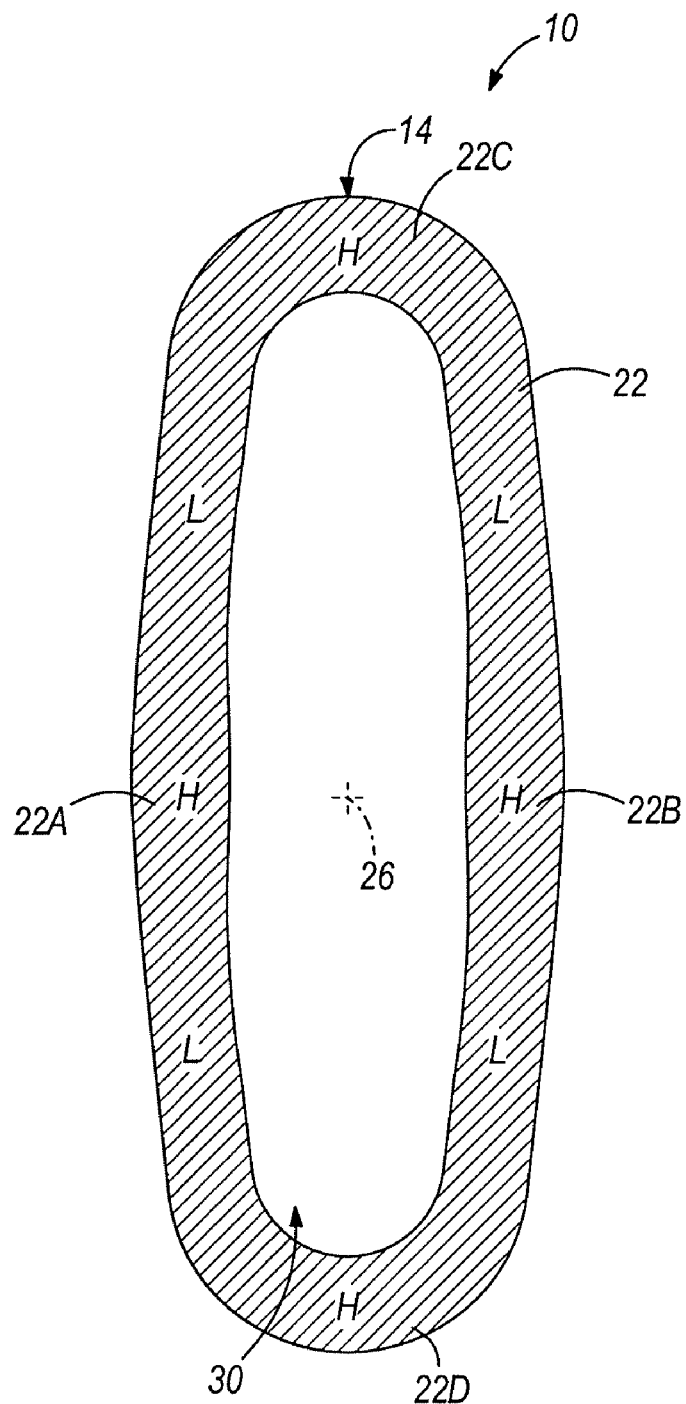
FIG. 2C is a cross-sectional view of the self-damping fuel rail shown in FIG. 1 taken along line 2-2 of FIG. 1, the self-damping fuel rail in a damping position.
Figure 3:
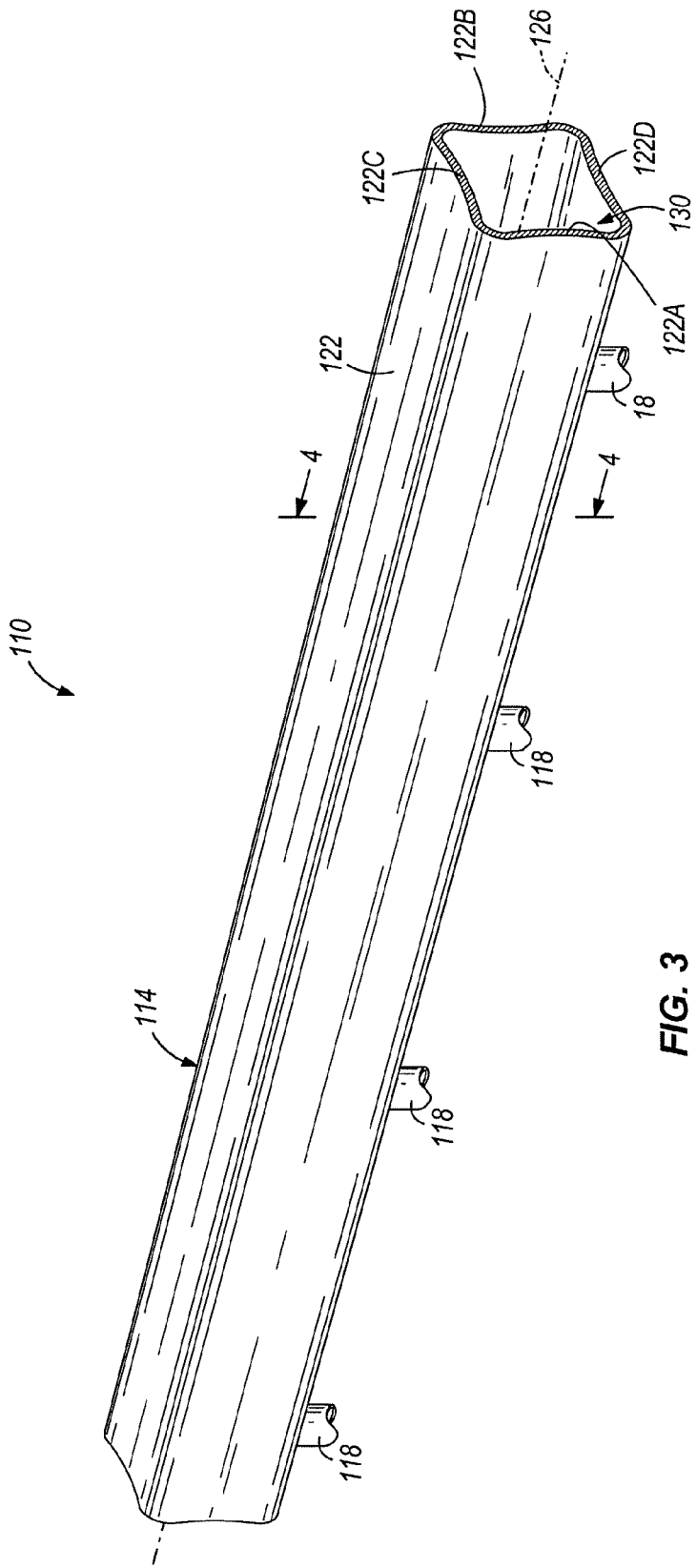
FIG. 3 is a perspective view of another construction of a self-damping fuel rail embodying the present invention.

As shown in FIGS. 2A, 2B, and 2C, the elongated tube 14 has a generally oval-shaped cross-section. In other embodiments, the elongated tube 14 may have, for example, a rectangular (FIGS. 4A to 4C), circular, triangular, or irregularly-shaped cross-section. In the illustrated embodiment, the elongated tube 14 defines a wall 22 and has a longitudinal axis 26 (FIG. 1) extending generally therethrough. The illustrated wall 22 defines a fuel passageway 30 where fuel may be temporarily stored in fluid communication with the fuel injectors.

Referring to FIG. 1, the illustrated fuel outlets 18 extend outwardly from the wall 22 to receive the fuel injectors and facilitate communication between the fuel passageway 30 and the fuel injectors. In some embodiments, the fuel outlets 18 may be integrally formed as a single piece with the elongated tube 14 or may be distinct pieces that are separable from the elongated tube 14. In other embodiments, the fuel outlets 18 may be formed as recesses or pockets in the wall 22 such that portions of the fuel injectors are inserted into the wall 22 to communicate directly with the fuel passageway 30. In such embodiments, the fuel outlets 18 may be internally threaded to receive threaded adapters that support and retain the fuel injectors.

As shown in FIGS. 2A to 2C, the wall 22 includes a first wall portion 22A and a second wall portion 22B. The first and second wall portions 22A, 22B are spaced apart from each other on opposing sides of the elongated tube 14. The illustrated wall 22 also includes a third wall portion 22C and a fourth wall portion 22D. The third and fourth wall portions 22C, 22D are positioned between the first and second wall portions 22A, 22B and are curved to help define the generally oval-shaped cross-section of the elongated tube 14. In the illustrated embodiment, the first and second wall portions 22A, 22B are movable (e.g., bendable, flexible, etc.) between a static position (FIG. 2A) when the fuel rail 10 is in a non-operative state, a dynamic position (FIG. 2B) when the fuel rail 10 is in an operative state and operating at a pressure higher than ambient pressure, and a damping position (FIG. 2C) when the fuel rail 10 is in the operative state and experiencing pressure pulsations created by the fuel injectors. The third and fourth wall portions 22C, 22D remain generally stationary regardless of the operating pressure of the fuel rail 10. Moving or flexing the first and second wall portions 22A, 22B from the dynamic position to the damping position helps dampen pressure pulsations within the fuel rail 10 that may result from actuation of the fuel injectors.

In the illustrated embodiment, the wall 22 of the elongated tube 14 is formed by a one-piece metallic extrusion of, for example, aluminum or an aluminum alloy. Since the wall 22 is extruded, it can be cut to any desired length and used in a variety of fuel systems. End caps (not shown) having fuel inlets and outlets (if necessary for a return-type fuel system) are coupled on the ends of the wall 22 prior to insertion of the fuel rail 10 into the fuel system. The end caps may be fastened to the elongated tube 14 using any suitable fastening method, including welding or brazing. In such embodiments, the one-piece construction of the wall 22 increases the durability of the fuel rail 10, provides optimum damping characteristics, and can be easily and inexpensively produced and assembled.

As shown in FIGS. 2A to 2C, the wall 22 has a substantially non-uniform thickness. The illustrated wall 22 is generally thicker at higher stress areas H such that a maximum wall stress of the self-damping fuel rail 10 is reduced. In addition, the wall 22 is generally thinner at lower stress areas L such that the wall stresses are substantially uniform throughout the fuel rail 10. Reducing the maximum stress helps inhibit fatigue failure of the fuel rail 10, while making the wall stresses substantially uniform increases the volume change per pressure pulsation and the fatigue life of the fuel rail 10.

Referring to FIG. 2A, the self-damping fuel rail 10 is shown in the non-operative state and the wall portions 22A, 22B are in the static position. In the non-operative state, an internal pressure, or first pressure, in the fuel rail 10 (i.e., a first fuel pressure within the fuel passageway 30) is substantially equal to the surrounding ambient pressure. Such a condition may arise when, for example, the internal combustion engine and fuel pump(s) are not running. In such a state, the first and second wall portions 22A, 22B are inwardly bowed, or curved, toward the longitudinal axis 26. In addition, the wall portions 22A, 22B are bowed away, or spaced apart, from corresponding reference planes 34A, 34B. The reference planes 34A, 34B represent the general position of the first and second wall portions 22A, 22B if the wall portions 22A, 22B were not inwardly bowed. In other embodiments, the first and second wall portions 22A, 22B may be inwardly bowed toward the longitudinal axis 26 and away from the reference planes 34A, 34B by a greater or lesser amount than that illustrated.

Referring to FIG. 2B, the self-damping fuel rail 10 is shown in the operative state and the wall portions 22A, 22B are in the dynamic position. In the operative state, the internal pressure, or second pressure, in the fuel rail 10 (i.e., a second fuel pressure within the fuel passageway 30) is generally higher than the surrounding ambient pressure (e.g., about five bar to about twenty bar). Such a condition may arise when, for example, the internal combustion engine and fuel pump(s) are running. In the illustrated state, the first and second wall portions 22A, 22B are moved, or flexed, outwardly away from the longitudinal axis 26 and the inwardly bowed position to increase the volume of the fuel rail 10. In the illustrated embodiment, when in the dynamic position, the wall portions 22A, 22B are substantially straightened such that they are generally coplanar with the reference planes 34A, 34B. However, in other embodiments, the wall portions 22A, 22B may be still inwardly bowed slightly away from the reference planes 34A, 34B when in the dynamic position. In yet other embodiments, the wall portions 22A, 22B may be slightly outwardly bowed past the reference planes 34A, 34B when in the dynamic position.

Referring to FIG. 2C, the self-damping fuel rail 10 is shown in the operative state and the wall portions 22A, 22B are in the damping position. The wall portions 22A, 22B move to the damping position to dampen pressure pulsations that occur during operation of the internal combustion engine. In the illustrated state, the first and second wall portions 22A, 22B are further flexed outwardly from the longitudinal axis 26 and past the reference planes 34A, 34B. Depending on how much the internal pressure increases, the wall portions 22A, 22B may flex outwardly by a greater or lesser amount than that illustrated. In operation, the wall portions 22A, 22B bend outwardly to temporarily relieve the increased internal pressure by increasing the volume of the fuel rail 10. Once fuel is released from the fuel rail 10 (e.g., by the fuel injectors), the internal pressure drops and the first and second wall portions 22A, 22B move back toward the dynamic position. The wall portions 22B, 22C repeatably move between the dynamic and damping positions to dampen internal pressure pulsations as the internal pressure changes. As such, the fuel rail 10 dampens the pressure pulsations without requiring an additional damper element positioned within the fuel passageway 30.

The illustrated self-damping fuel rail 10 provides improved damping compared to currently available, or prior art, self-damping fuel rails. In prior art fuel rails, the walls are typically straight when in the static position and bow outwardly when in the dynamic position. The walls must then bow outwardly even further to dampen pressure pulsations. However, starting with outwardly-bowed walls at operating pressure does not provide optimal damping in a fuel rail.

FIGS. 3, 4A, 4B, and 4C illustrate another self-damping fuel rail 110 embodying the invention. The fuel rail 110 is similar to the fuel rail 10 discussed above with reference to FIGS. 1, 2A, and 2B, and like parts have been give the same reference number plus 100. Reference is hereby made to the discussion above regarding the self-damping fuel rail 10 for description of features, elements, and alternatives of the fuel rail 110 not specifically discussed herein.

Similar to the previous construction, the illustrated self-damping fuel rail 110 includes an elongated tube 114 and a plurality of fuel outlets 118. The elongated tube 114 defines a wall 122 and has a longitudinal axis 126 extending generally therethrough. In the illustrated embodiment, the wall 122 includes four wall portions 122A, 122B, 122C, 122D such that the elongated tube 114 has a generally rectangular (e.g., square) cross-section.

Figure 4A:
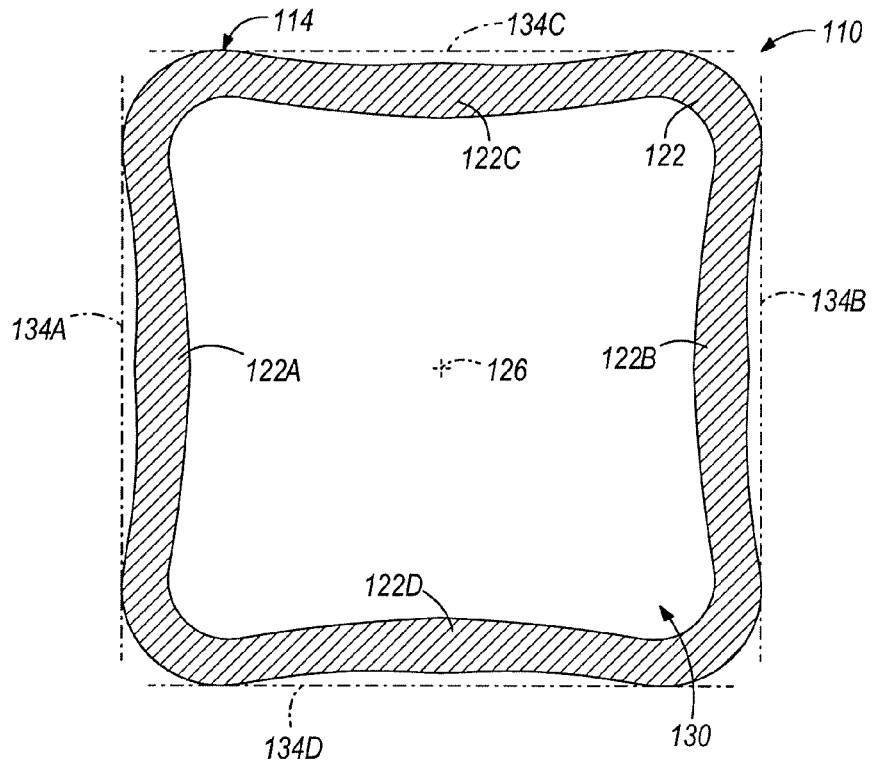
FIG. 4A is a cross-sectional view of the self-damping fuel rail shown in FIG. 3 taken along line 4-4 of FIG. 3, the self-damping fuel rail in a static position.
Figure 4B:
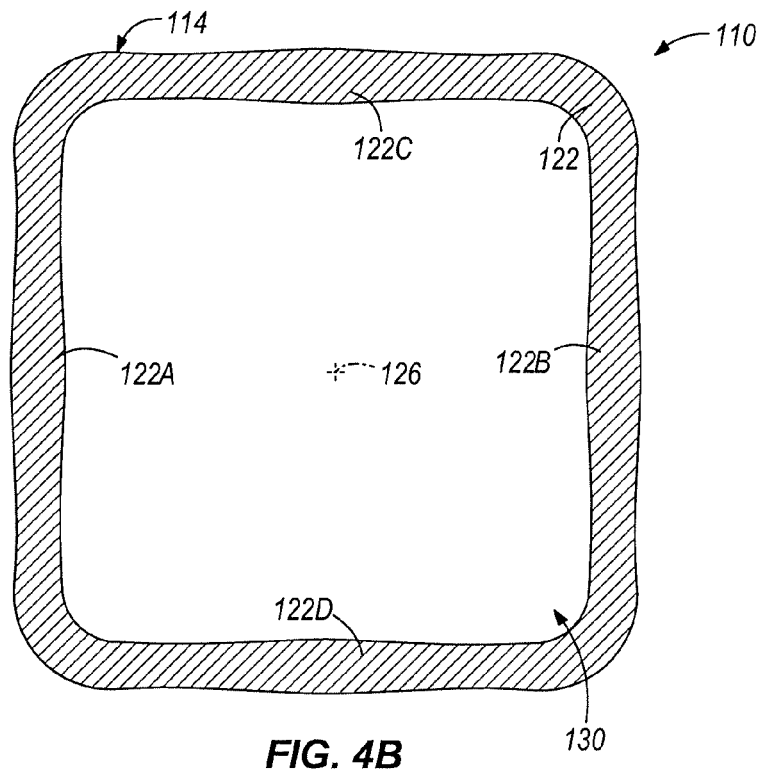
FIG. 4B is a cross-sectional view of the self-damping fuel rail shown in FIG. 3 taken along line 4-4 of FIG. 3, the self-damping fuel rail in a dynamic position.
Figure 4C:
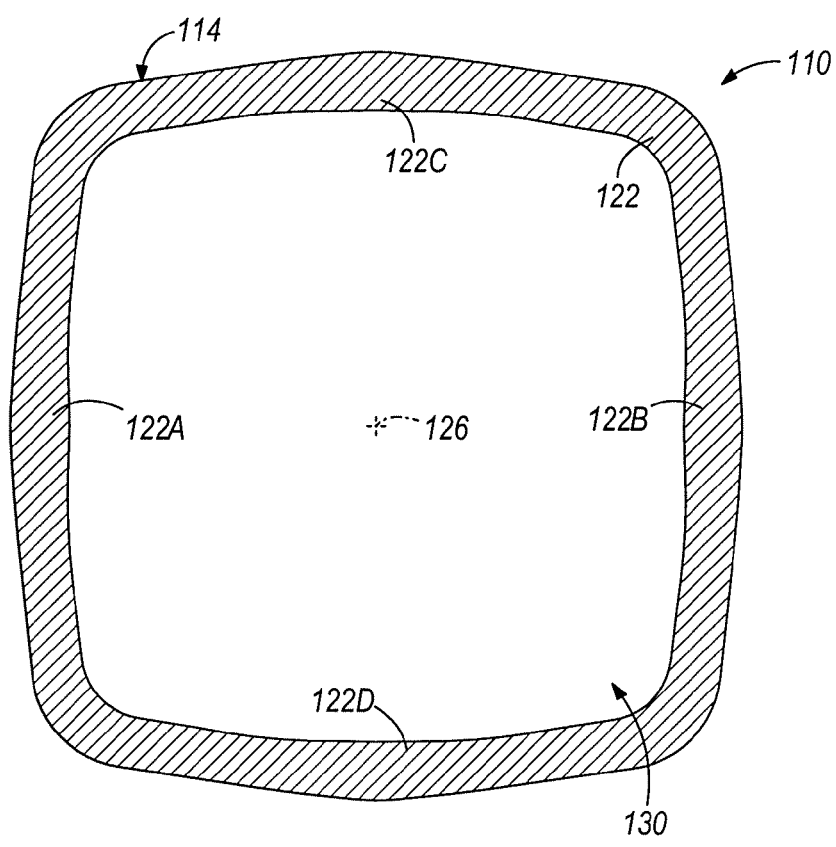
FIG. 4C is a cross-sectional view of the self-damping fuel rail shown in FIG. 3 taken along line 4-4 of FIG. 3, the self-damping fuel rail in a damping position.

As shown in FIGS. 4A, 4B, and 4C, the first and second wall portions 122A, 122B are spaced apart from each other on opposing sides of the elongated tube 114, and the third and fourth wall portions 122C, 122D are spaced apart from each other on opposing sides adjacent to and between the first and second wall portions 122A, 122B. In the illustrated embodiment, the wall portions 122A-122D are at substantially right angles relative to the adjacent wall portions to obtain the generally rectangular cross-section. In addition, each wall portion 122A-122D is generally the same length such that the cross-section is substantially square. In other embodiments, the wall portions 122A-122D may have unequal lengths and/or may not be at substantially right angles relative to each other.

Similar to the self-damping fuel rail 10 described above, the wall portions 122A-122D of the fuel rail 110 are movable between a static position (FIG. 4A), a dynamic position (FIG. 4B), and a damping position (FIG. 4C). Referring to FIG. 4A, when the fuel rail 10 is in the non-operative state, the four wall portions 122A-122D are bowed inwardly toward the longitudinal axis 126 and away from corresponding reference planes 134A-134D. Referring to FIG. 4B, when the fuel rail 110 is in the operative state, the wall portions 122A-122D bend or flex away from the longitudinal axis 126 in response to an increased internal pressure. Referring to FIG. 4C, the wall portions 122A-122D flex away from the longitudinal axis 126 even further to dampen pressure pulsations within the fuel rail 10. Similar to the previous construction, the wall portions 122A-122D may bend away from the longitudinal axis 126 by a greater or lesser amount when in the dynamic position and/or the damping position than that illustrated. Additionally, in some embodiments, only one or a few of the wall portions 122A-122D may be configured to bend away from the longitudinal axis 126 when the fuel rail 110 is in the operative state.

Figure 5:
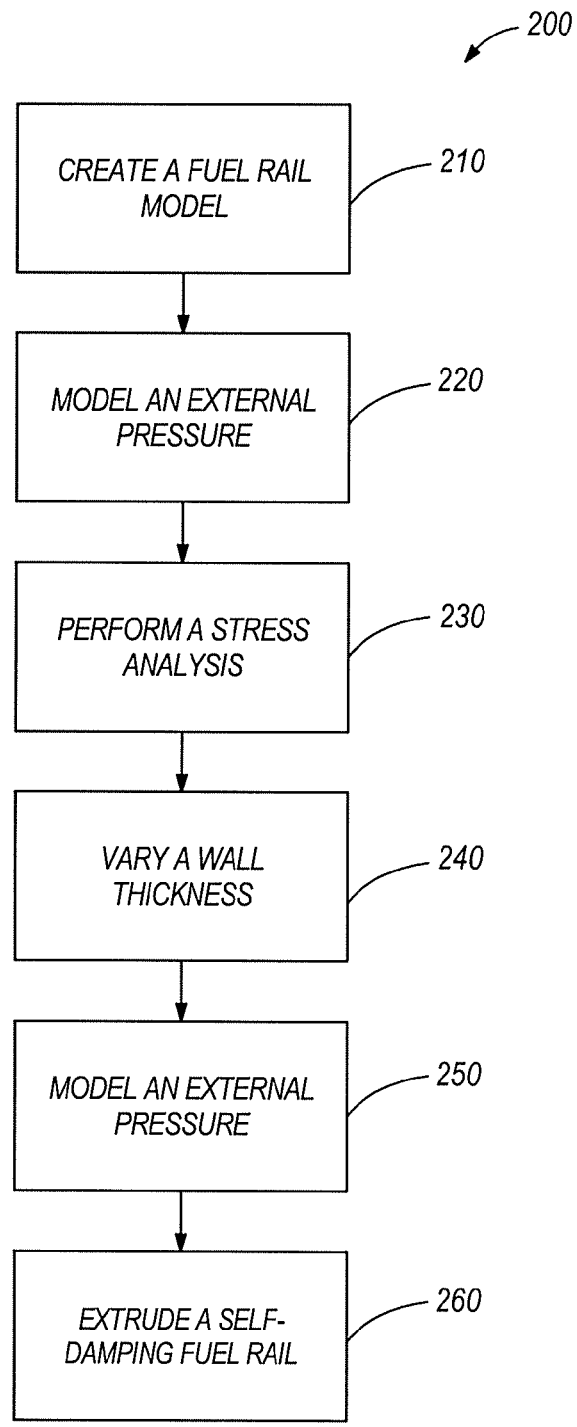
FIG. 5 is a flowchart depicting a method of designing a self-damping fuel rail.

FIG. 5 is a flowchart 200 depicting a method of designing and manufacturing a self-damping fuel rail, such as one of the self-damping fuel rails 10, 110 discussed above. Although the following method is described with reference to the fuel rail 10 shown in FIG. 1, it should be readily apparent that the method may be similarly applied to design and manufacture the fuel rail 110 shown in FIG. 3, as well as other self-damping fuel rails. In some embodiments, the self-damping fuel rail 10 is designed as described below using finite element analysis (FEA) software, although other suitable design techniques or software may also be employed.

To start, an operator creates a first fuel rail model 204 (FIG. 6) having a desired cross-section (e.g., the oval-shaped cross-section), as indicated at step 210. In the illustrated embodiment, the desired cross-section is generally the same as the cross-section of the elongated tube 14 shown in FIG. 2B when the wall portions 22A, 22B are in the dynamic position. That is, the first fuel rail model 204 is created having a cross-section that is substantially similar to the desired cross-section when the internal operating pressure is equal to the second pressure.

Figures 6, 7:
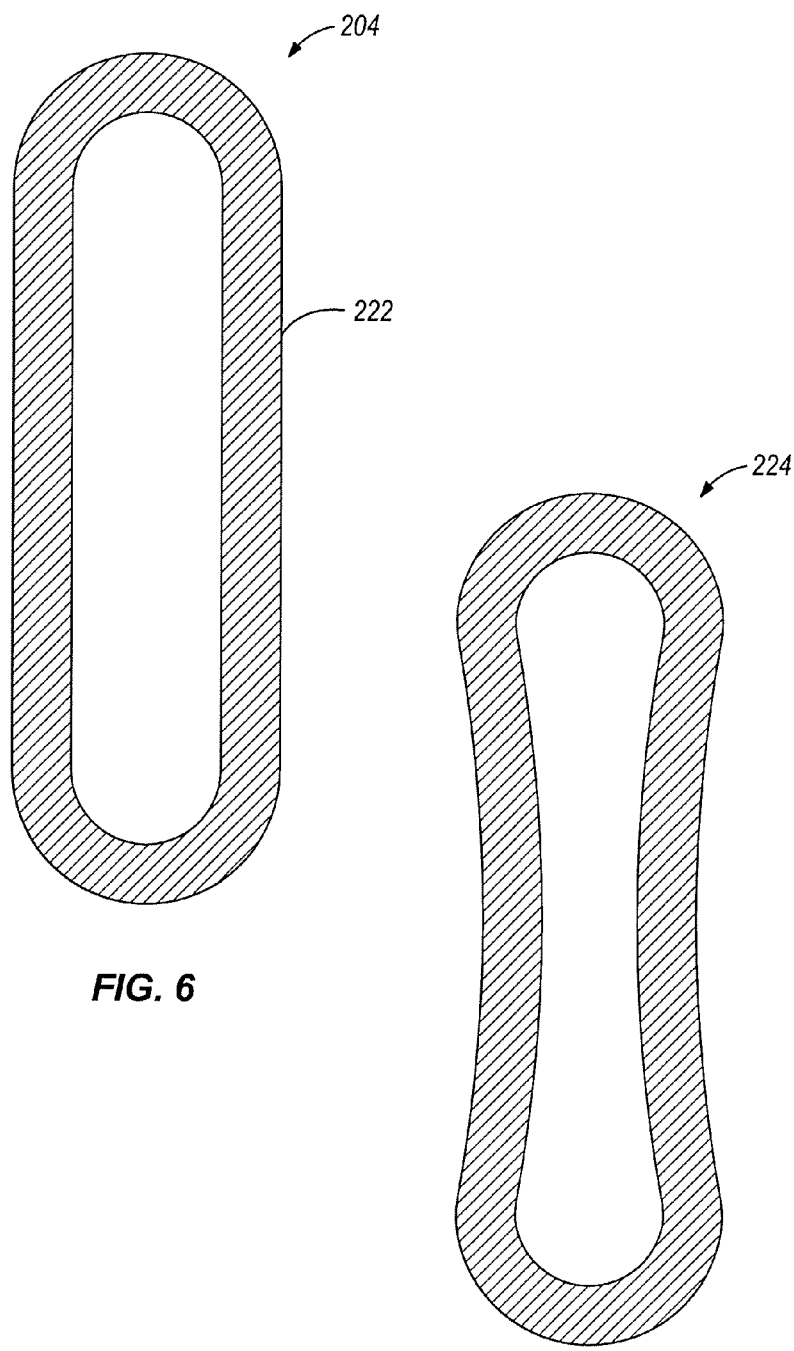
FIG. 6 is a cross-sectional view of a first fuel rail model.
FIG. 7 is a cross-sectional view of a second, externally pressurized fuel rail model.

Then, as indicated at step 220, the operator models an external pressure and applies the external pressure to an outside surface 222 of the first fuel rail model 204 to create a second, or externally pressurized, fuel rail model 224 (FIG. 7). The second fuel rail model 224 has a cross-sectional shape similar to the cross-section of the fuel rail 10 in the static position (FIG. 2A); however, as shown in FIG. 7, the second fuel rail model 224 has a substantially uniform wall thickness. In the illustrated embodiment, the external pressure is substantially equal to an operating pressure (e.g., about five bar to about twenty bar) of the fuel rail 10. In other embodiments, the operator may select a different external pressure to model and apply on the first fuel rail model 204 depending upon the desired operating characteristics of the fuel rail 10.

Next, as indicated at step 230, the operator performs a stress analysis on the second fuel rail model 224 to determine the location of the higher stress areas H and the lower stress areas L on the model 224. The higher and lower stress areas H, L are generally located at the positions shown in FIGS. 2A to 2C, or at positions substantially corresponding to the illustrated positions on fuel rails having different cross-sectional shapes.

As indicated at step 240, using the information from the stress analysis, the operator varies a wall thickness of the first fuel rail model 204 (FIG. 6) to create a third, or varied wall thickness, model (similar to FIG. 2B). In the illustrated embodiment, the operator increases the wall thickness at the higher stress areas H to reduce a maximum wall stress of the fuel rail 10 and decreases the wall thickness at the lower stress areas L such that the wall stresses are substantially uniform throughout the self-damping fuel rail 10. For example, the operator may decrease the wall thickness at one area, calculate the stress and/or strain at that area, and then vary the wall thickness at the other areas to match the stress and/or strain calculated at the original area. In some embodiments, the operator may only wish to decrease the maximum wall stress below a suitable level or threshold. In such embodiments, the operator may only increase the wall thickness at the higher stress areas H. In other embodiments, the maximum wall stress may already be below the threshold. In such embodiments, the operator may only decrease the wall thickness at the lower stress areas L such that the wall stresses are substantially uniform throughout the fuel rail 10.

After creating the third fuel rail model, the operator models the external pressure on the third fuel rail model to create a fourth, or self-damping, fuel rail model (similar to FIG. 2A), as indicated at step 250. The fourth fuel rail model is substantially similar to the final shape and configuration of the self-damping fuel rail 10.

Finally, as indicated at step 260, the operator extrudes an elongated tube having the cross-section of the fourth fuel rail model to create the self-damping fuel rail 10.

The illustrated self-damping fuel rails 10, 110 are operable to dampen pressure pulsations within a fuel injection system without a damper element positioned within the fuel passageways 30, 130. As such, the number of components of the fuel rails 10, 110 is reduced, decreasing the assembly time and overall cost of the fuel rails 10, 110.

The self-damping fuel rails 10, 110 are also configured to maximize the volume change of the fuel passageways 30, 130 per pressure pulsation by varying wall thicknesses of the fuel rails 10, 110. In addition, increasing the wall thicknesses of the fuel rails 10, 110 reduces maximum stresses in the elongated tubes 14, 114 to inhibit fatigue failure of the fuel rails 10, 110.

Various features and advantages of the invention are set forth in the following claims.

What is claimed is:

1. A self-damping fuel rail for a fuel-injected internal combustion engine, the self-damping fuel rail comprising:
   an elongated tube defining a wall and having a longitudinal axis, the wall defining a fuel passageway and having a first wall portion movable between a first position bowed inwardly toward the longitudinal axis when the self-damping fuel rail is in a non-operative state, and a second position moved outwardly away from the longitudinal axis when the self-damping fuel rail is in an operative state; and
   at least one fuel outlet configured to facilitate communication between the fuel passageway and a fuel injector, wherein the wall has a non-uniform thickness.

2. The self-damping fuel rail of claim 1, wherein, in the non-operative state, a fuel in the fuel passageway has a first fuel pressure, and wherein, in the operative state, the fuel in the fuel passageway has a second fuel pressure higher than the first fuel pressure.

3. The self-damping fuel rail of claim 1, wherein, in the second position, the first wall portion is in a substantially straightened position, and wherein the first wall portion is movable to a third position bowed outwardly from the substantially straightened position in response to pressure pulsations in the fuel passageway.

4. The self-damping fuel rail of claim 1, wherein the elongated tube has a generally oval-shaped cross-section.

5. The self-damping fuel rail of claim 1, wherein the elongated tube has a generally rectangular cross-section.

6. The self-damping fuel rail of claim 1, wherein the wall further includes a second wall portion movable between a first position bowed inwardly toward the longitudinal axis when the self-damping fuel rail is in the non-operative state, and a second position moved outwardly away from the longitudinal axis when the self-damping fuel rail is in the operative state.

7. The self-damping fuel rail of claim 6, wherein the wall further includes a third wall portion and a fourth wall portion, and wherein the third wall portion and the fourth wall portion are each movable between a first position bowed inwardly toward the longitudinal axis when the self-damping fuel rail is in the non-operative state, and a second position moved outwardly away from the longitudinal axis when the self-damping fuel rail is in the operative state.

8. The self-damping fuel rail of claim 1, wherein the wall is formed by a one-piece metallic extrusion.

9. The self-damping fuel rail of claim 1, wherein there is no damper element positioned within the fuel passageway.

10. A method of damping pressure pulsations within a self-damping fuel rail of a fuel-injected internal combustion engine, the self-damping fuel rail including an elongated tube and at least one fuel outlet, the elongated tube defining a wall and having a longitudinal axis, the wall defining a fuel passageway and having a first wall portion, the at least one fuel outlet configured to facilitate communication between the fuel passageway and the fuel injector, the method comprising:
   positioning the first wall portion in a first position inwardly bowed toward the longitudinal axis when a fuel in the fuel passageway has a first fuel pressure; and
   moving the first wall portion to a second position moved outwardly away from the longitudinal axis in response to the fuel in the fuel passageway achieving a second fuel pressure higher than the first fuel pressure,
   wherein moving the first wall portion to the second position includes moving the first wall portion to a substantially straightened position.

11. The method of claim 10, further comprising moving the first wall portion to a third position outwardly bowed from the straightened position in response to pressure pulsations in the fuel passageway.

12. The method of claim 10, further comprising moving the first wall portion substantially back to the first position in response to the fuel in the fuel passageway returning to the first fuel pressure.

13. The method of claim 10, wherein the wall includes a second wall portion, and further comprising:
   positioning the second wall portion in a first position inwardly bowed toward the longitudinal axis when the fuel in the fuel passageway has the first fuel pressure; and
   moving the second wall portion to a second position moved outwardly away from the longitudinal axis in response to the fuel in the fuel passageway achieving the second fuel pressure.

14. The method of claim 13, wherein the wall includes a third wall portion and a fourth wall portion, and further comprising:
   positioning each of the third wall portion and the fourth wall portion in a first position inwardly bowed toward the longitudinal axis when the fuel in the fuel passageway has the first fuel pressure; and
   moving each of the third wall portion and the fourth wall portion to a second position moved outwardly away from the longitudinal axis in response to the fuel in the fuel passageway achieving the second fuel pressure.

15. A method of designing a self-damping fuel rail, the method comprising:
   creating a first fuel rail model;
   modeling an external pressure on the first fuel rail model to create a second fuel rail model;
   performing a stress analysis on the second fuel rail model;
   varying a wall thickness of at least a portion of the first fuel rail model based on the stress analysis to create a third fuel rail model;
   modeling the external pressure on the third fuel rail model to create a fourth fuel rail model; and
   extruding a self-damping fuel rail according to the fourth fuel rail model.

16. The method of claim 15, wherein creating the first fuel rail model includes creating a first fuel rail model having a cross-section that is substantially similar to a desired cross-section of the self-damping fuel rail when an internal operating pressure is applied to the self-damping fuel rail.

17. The method of claim 15, wherein the external pressure is substantially equal to an internal operating pressure of the self-damping fuel rail.

18. The method of claim 15, wherein varying the wall thickness of at least a portion of the first fuel rail model includes increasing the wall thickness of at least a portion of the first fuel rail model to reduce a maximum wall stress of the self-damping fuel rail.

19. The method of claim 15, wherein varying the wall thickness of at least a portion of the first fuel rail model includes at least one of increasing the wall thickness and decreasing the wall thickness of at least a portion of the first fuel rail model such that wall stresses are substantially uniform throughout the self-damping fuel rail.

20. The method of claim 15, wherein creating the first fuel rail model includes creating the first fuel rail model using finite element analysis software.

\* \* \* \* \*